US008235798B2

(12) United States Patent
Fitzsimons et al.

(10) Patent No.: US 8,235,798 B2
(45) Date of Patent: Aug. 7, 2012

(54) GAMING SYSTEM HAVING CONFIGURABLE MECHANICAL REELS

(75) Inventors: Matthew R. Fitzsimons, Lake in the Hills, IL (US); James M. Rasmussen, Chicago, IL (US); Eric T. Ryan, Crest Hill, IL (US); Steven J. Lee, Naperville, IL (US)

(73) Assignee: WMS Gaming Inc., Waukegen, IL (US)

( * ) Notice: Subject to any disclaimer, the term of this patent is extended or adjusted under 35 U.S.C. 154(b) by 300 days.

(21) Appl. No.: 12/599,997

(22) PCT Filed: May 14, 2008

(86) PCT No.: PCT/US2008/006108

§ 371 (c)(1),
(2), (4) Date: Nov. 13, 2009

(87) PCT Pub. No.: WO2008/143845

PCT Pub. Date: Nov. 27, 2008

(65) Prior Publication Data

US 2010/0248809 A1 Sep. 30, 2010

Related U.S. Application Data

(60) Provisional application No. 60/930,814, filed on May 18, 2007.

(51) Int. Cl.
*G06F 17/00* (2006.01)

(52) U.S. Cl. ........................................................ 463/20

(58) Field of Classification Search ............... 463/16–25
See application file for complete search history.

(56) References Cited

U.S. PATENT DOCUMENTS 7,806,407 B2 * 10/2010 Ozaki et al. .................. 273/274
2001/0031658 A1 10/2001 Ozaki et al.
2007/0032293 A1 * 2/2007 Rasmussen ..................... 463/22
2007/0060255 A1 * 3/2007 Baerlocher et al. ............ 463/16
2010/0099483 A1 * 4/2010 Bleich et al. .................... 463/20

FOREIGN PATENT DOCUMENTS

WO WO 2007/011717 A2 1/2007

OTHER PUBLICATIONS

Written Opinion corresponding to co-pending International Patent Application Serial No. PCT/US2008/006108, European Patent Office; dated Oct. 6, 2008; 3 pages.

International Search Report corresponding to co-pending International Patent Application Serial No. PCT/US2008/006108, European Patent Office; dated Oct. 6, 2008; 5 pages.

* cited by examiner

*Primary Examiner* — Ronald Laneau
(74) *Attorney, Agent, or Firm* — Nixon Peabody LLP

(57) ABSTRACT

A gaming system for conducting a wagering game includes a wager input device, a display for displaying a randomly selected outcome of a wagering game, and a controller operatively coupled to the display and the wager input device to operate in a plurality of selectable game modes of which a selected one is a current game mode. The display has an array of reel strips. Each of the selectable game modes is respectively associated with a subset of the reel strips of the array. A first game mode of the plurality of selectable game modes has at least one reel strip that differs from at least one reel strip of a second game mode of the plurality of selectable game modes. The second game mode has at least one reel strip that differs from at least one reel strip of the first game mode. The controller is operative to cause the display to selectively conceal all of the reel strips other than that subset of the reel strips associated with the current game mode, for example, by causing movement of a reel window or reel strips with respect to the other, or by adjusting the opacity of one or more controllable-opacity segments.

20 Claims, 11 Drawing Sheets

312a 312b 312c 312d 312e

310

312a 312b 312c 312d 312e

330

312a 312b 312c 312d 312e

340

GAMING SYSTEM HAVING CONFIGURABLE MECHANICAL REELS

CROSS-REFERENCE TO RELATED APPLICATIONS

This application is a U.S. National Stage of International Application No. PCT/US2008/006108, filed May 14, 2008, which claims the benefit of U.S. Provisional Application No. 60/930,814, filed on May 18, 2007, both of which are incorporated herein by reference in their entirety.

COPYRIGHT AUTHORIZATION

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to gaming machines, and methods for playing wagering games, and more particularly, to a gaming system having a configurable display for selectively revealing or concealing symbol-bearing reel strips, each corresponding to one or more selectable game modes.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for gaming machine manufacturers to continuously develop new games and improved gaming enhancements that will attract frequent play through enhanced entertainment value to the player.

One concept that has been successfully employed to enhance the entertainment value of a game is the concept of a "secondary" or "bonus" game that may be played in conjunction with a "basic" game. The bonus game may comprise any type of game, either similar to or completely different from the basic game, which is entered upon the occurrence of a selected event or outcome in the basic game. Generally, bonus games provide a greater expectation of winning than the basic game and may also be accompanied with more attractive or unusual video displays and/or audio. Bonus games may additionally award players with "progressive jackpot" awards that are funded, at least in part, by a percentage of coin-in from the gaming machine or a plurality of participating gaming machines. Because the bonus game concept offers tremendous advantages in player appeal and excitement relative to other known games, and because such games are attractive to both players and operators, there is a continuing need to develop gaming systems with new types of bonus games to satisfy the demands of players and operators.

From time to time, it may be desirable to change or reconfigure the character, design, theme, or rationale of the games implemented in the gaming machines, in order to more closely match trends or seasonal variation in customer interest, to accommodate promotional relationships, or for consistency with themes or events in entertainment, sports, news, and the like. Gaming machines that employ a fixed set of display symbols, such as slot machines employing an electromechanical reel display, are more difficult to reconfigure than machines employing completely electronic displays, and there have heretofore been limited options for such reconfiguration. The entire gaming machine could be replaced with a new machine embodying a different game. Alternatively, the machine could be retrofitted, in situ, with new display equipment, such as new reels or new reel strips, containing the display symbols needed for a different game. Each of these options is costly, time-consuming, and disruptive of other activities on the gaming floor. For example, changing reels or reel strips may take 10 minutes per gaming machine, and changing reels or reel strips for a bank of gaming machines could take an hour or more. This requires expensive craft labor, and machines do not earn revenue for the operator while being serviced. Accordingly, the need exists for methods and apparatus for reconfiguring gaming machines having a fixed set of display symbols, so as to present to the player a different game, game theme, or game episode, while minimizing the aforementioned disadvantages of existing reconfiguration methods.

SUMMARY OF THE INVENTION

According to one aspect of the present invention, a gaming system for conducting a wagering game includes a wager input device, a display for displaying a randomly selected outcome of a wagering game, and a controller operatively coupled to the display and the wager input device to operate in a plurality of selectable game modes of which a selected one is a current game mode. The display has an array of reel strips, and each of the selectable game modes is respectively associated with a subset of the reel strips of the array. A first game mode of the plurality of selectable game modes has at least one reel strip that differs from at least one reel strip of a second game mode of the plurality of selectable game modes. The second game mode has at least one reel strip that differs from at least one reel strip of the first game mode. The controller is operative to cause the display to selectively conceal all of the reel strips other than that subset of the reel strips associated with the current game mode. Each of the reel strips contains a plurality of game symbols. In some embodiments, the display includes a reel glass through which the array is viewed, and a reel window that selectably allows the subset of reel strips associated with the current game mode to be viewed. In order to select which reel strips are concealed or viewable, the reel window may be moved with respect to the reels, or the reels may be moved with respect to the reel window or display. In some embodiments, the reel strips are arranged in generally adjacent positions along an axis, and the reel window or the reel strips move with respect to the other along a direction parallel to the axis. In some embodiments, the display includes one or more segments of controllable opacity which allows the subset of reel strips associated with the current game mode to be viewed and conceals all other reel strips. The controllable opacity segments may be implemented using a transmissive mode liquid-crystal panel.

According to another aspect of the invention, one or more computer readable storage media are encoded with instructions for directing a gaming system to perform a method of operating a wagering game. The method comprises receiving a wager via a wager input device, selecting a current game mode from a plurality of available selectable game modes via a controller, each game mode being respectively associated with a subset of a plurality of reel strips of a display, selectively concealing each of the reel strips other than the subset of reel strips associated with the current game mode, responsive to said controller, and displaying a randomly selected outcome of the wagering game on reel strips of the current game mode via the display. In some embodiments, the step of selectively concealing includes moving at least one reel window in a directly generally parallel to an axis along which the reel strips are located. In some embodiments, the step of selectively concealing includes moving at least one reel strip transversely to a reel window. In some embodiments, the step of selectively concealing includes adjusting the opacity of at least one controllable-opacity segment to conceal all reel strips other than the subset of reel strips associated with the current game mode.

According to a further aspect of the invention, a method of conducting a wagering game on a gaming system includes selecting a game mode from a plurality of available game modes, each of the plurality of game modes being associated with a subset of a plurality of symbol-bearing reel strips, each of said subsets containing less than all of the plurality of reel strips. The method further includes receiving a wager, determining an outcome randomly selected from among a plurality of possible outcomes associated with the selected game mode, displaying the outcome as an array of symbols, the symbols being selected from that subset of reel strips associated with the selected game mode, and providing an award if the displayed outcome indicates a winning combination. In some embodiments, the selecting step includes aligning at least one reel window with a portion of at least one reel strip such that only symbols from the subset of reel strips associated with the selected game mode are visible.

Additional aspects of the invention will be apparent to those of ordinary skill in the art in view of the detailed description of various embodiments, which is made with reference to the drawings, a brief description of which is provided below.

DETAILED DESCRIPTION

Figure 1A:
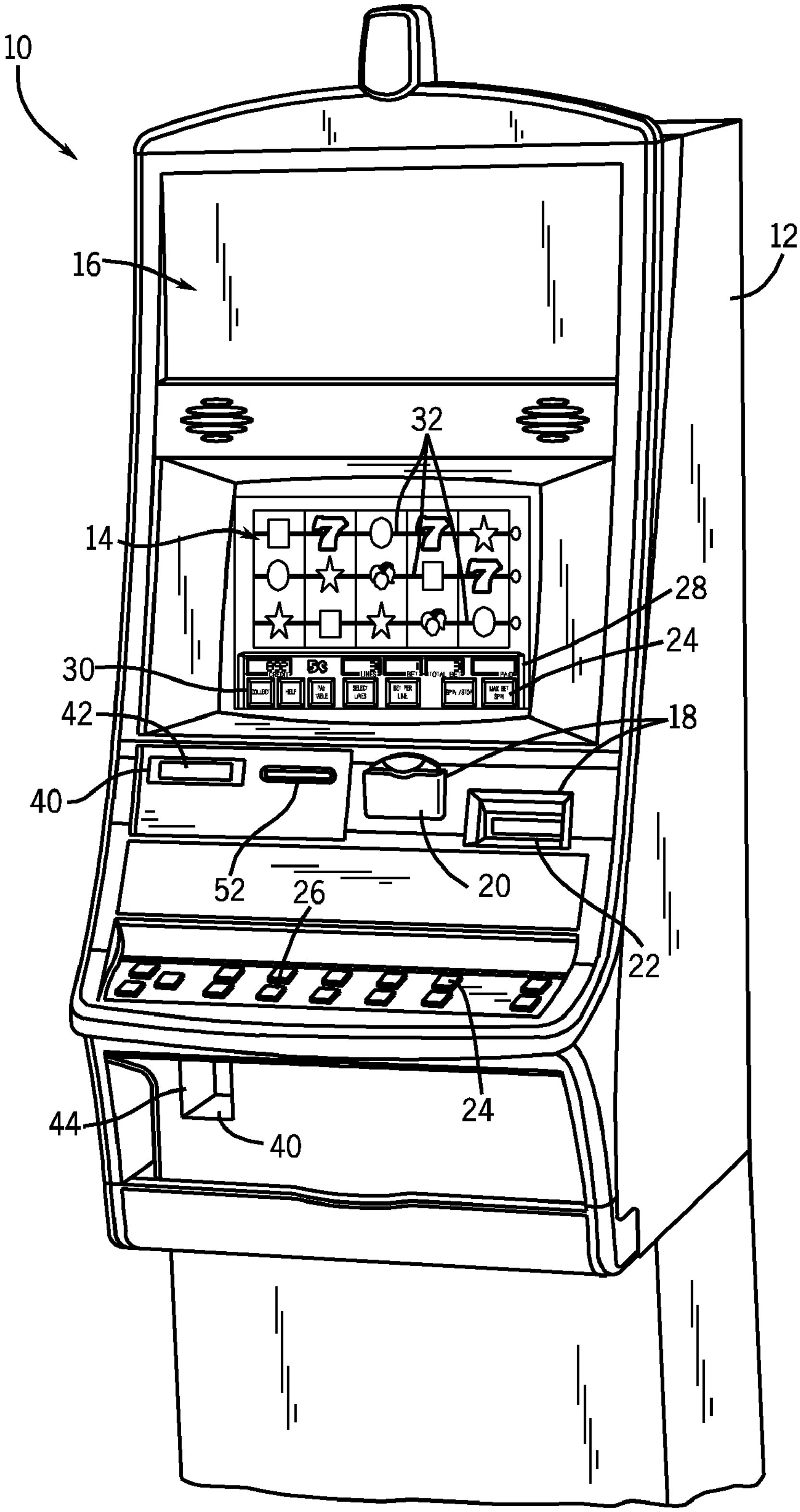
FIG. 1*a* is a perspective view of a free standing gaming machine embodying the present invention.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIG. 1*a*, a gaming machine 10 is used in gaming establishments such as casinos. With regard to the present invention, the gaming machine 10 may be any type of gaming machine and may have varying structures and methods of operation. For example, the gaming machine 10 may be an electromechanical gaming machine configured to play mechanical slots, any other game compatible with a display comprising at least one symbol-bearing reel strip. The gaming machine 10 may also be a hybrid gaming machine integrating both electronic and electromechanical displays.

The gaming machine 10 comprises a housing 12 and includes input devices, including a value input device 18 and a player input device 24. For output the gaming machine 10 includes a primary display 14 for displaying information about the basic wagering game. The primary display 14 can also display information about a bonus wagering game and a progressive wagering game. The gaming machine 10 may also include a secondary display 16 for displaying game events, game outcomes, and/or signage information. While these typical components found in the gaming machine 10 are described below, it should be understood that numerous other elements may exist and may be used in any number of combinations to create various forms of a gaming machine 10.

The value input device 18 may be provided in many forms, individually or in combination, and is preferably located on the front of the housing 12. The value input device 18 receives currency and/or credits that are inserted by a player. The value input device 18 may include a coin acceptor 20 for receiving coin currency (see FIG. 1*a*). Alternatively, or in addition, the value input device 18 may include a bill acceptor 22 for receiving paper currency. Furthermore, the value input device 18 may include a ticket reader, or barcode scanner, for reading information stored on a credit ticket, a card, or other tangible portable credit storage device. The credit ticket or card may also authorize access to a central account, which can transfer money to the gaming machine 10.

The player input device 24 comprises a plurality of push buttons 26 on a button panel for operating the gaming machine 10. In addition, or alternatively, the player input device 24 may comprise a touch screen 28 mounted by adhesive, tape, or the like over the primary display 14 and/or secondary display 16. The touch screen 28 contains soft touch keys 30 denoted by graphics on the underlying primary display 14 and used to operate the gaming machine 10. The touch screen 28 provides players with an alternative method of input. A player enables a desired function either by touching the touch screen 28 at an appropriate touch key 30 or by pressing an appropriate push button 26 on the button panel. The touch keys 30 may be used to implement the same functions as push buttons 26. Alternatively, the push buttons 26 may provide inputs for one aspect of operating the game, while the touch keys 30 may allow for input needed for another aspect of the game.

The various components of the gaming machine 10 may be connected directly to, or contained within, the housing 12, as seen in FIG. 1*a*, or may be located outboard of the housing 12 and connected to the housing 12 via a variety of different wired or wireless connection methods. Thus, the gaming machine 10 comprises these components whether housed in the housing 12, or outboard of the housing 12 and connected remotely.

The operation of the basic wagering game is displayed to the player on the primary display 14. The primary display 14 can also display the bonus game associated with the basic wagering game. The primary display 14 of the gaming machine 10 may include a number of mechanical reels to display the outcome in visual association with at least one payline 32. Alternatively, the primary display 14 may take the form of a hybrid display incorporating both electromechanical display components, such as reels, with an electronic display, which may include a cathode ray tube (CRT), a high resolution LCD, a plasma display, an LED, or any other type of display suitable for use in the gaming machine 10. As shown, the primary display 14 includes the touch screen 28 overlaying the entire display (or a portion thereof) to allow players to make game-related selections. In the illustrated embodiment, the gaming machine 10 is an "upright" version in which the primary display 14 is oriented vertically relative to the player. Alternatively, the gaming machine may be a "slant-top" version in which the primary display 14 is slanted at about a thirty-degree angle toward the player of the gaming machine 10.

A player begins play of the basic wagering game by making a wager via the value input device 18 of the gaming machine 10. A player can select play by using the player input device 24, via the buttons 26 or the touch screen keys 30. The basic game consists of a plurality of symbols arranged in an array, and includes at least one payline 32 that indicates one or more outcomes of the basic game. Such outcomes are randomly selected in response to the wagering input by the player. At least one of the plurality of randomly-selected outcomes may be a start-bonus outcome, which can include any variations of symbols or symbol combinations triggering a bonus game.

In some embodiments, the gaming machine 10 may also include a player information reader 52 that allows for identification of a player by reading a card with information indicating his or her true identity. The player information reader 52 is shown in FIG. 1*a* as a card reader, but may take on many forms including a ticket reader, bar code scanner, RFID transceiver or computer readable storage medium interface. Currently, identification is generally used by casinos for rewarding certain players with complimentary services or special offers. For example, a player may be enrolled in the gaming establishment's loyalty club and may be awarded certain complimentary services as that player collects points in his or her player-tracking account. The player inserts his or her card into the player information reader 52, which allows the casino's computers to register that players wagering at the gaming machine 10. The gaming machine 10 may use the secondary display 16 or other dedicated player-tracking display for providing the player with information about his or her account or other player-specific information. Also, in some embodiments, the information reader 52 may be used to restore game assets that the player achieved and saved during a previous game session.

Figure 1B:
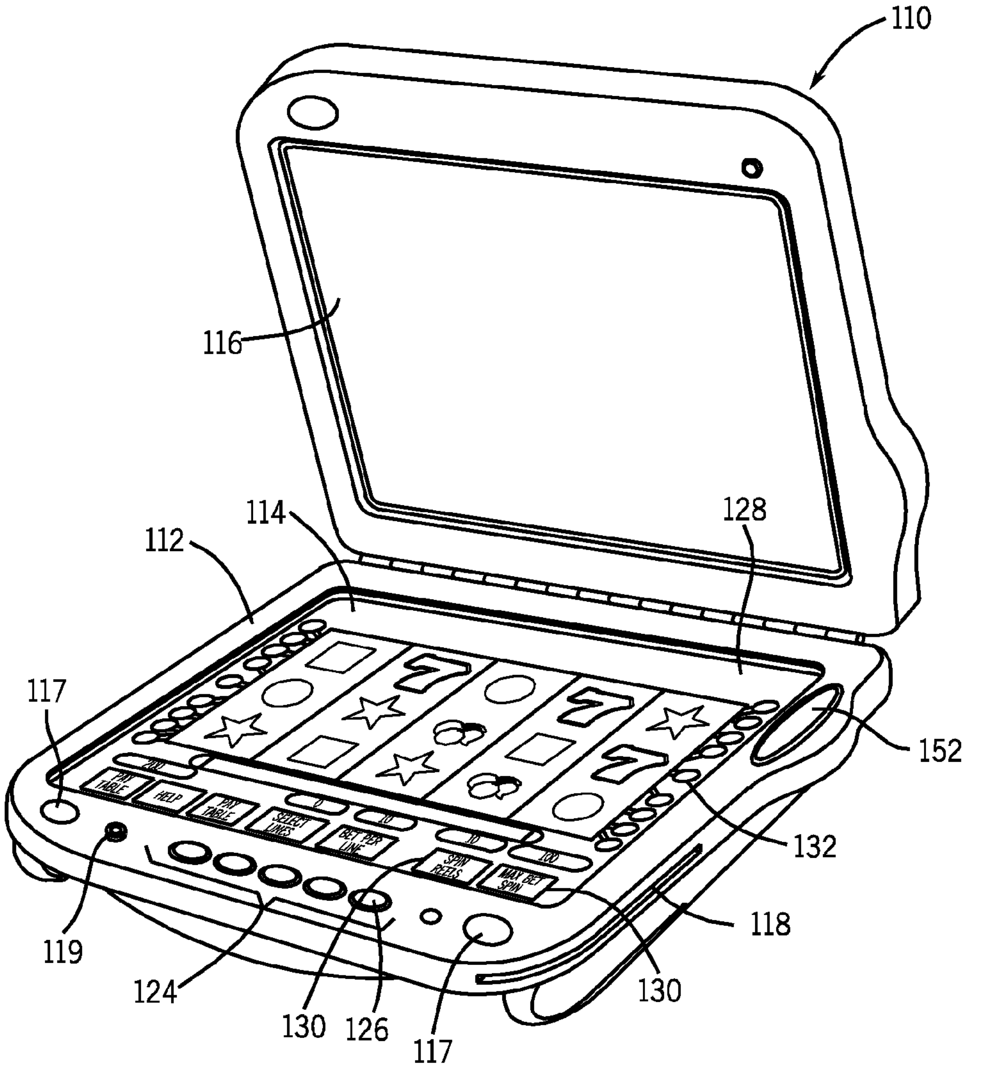
FIG. 1*b* is a perspective view of a handheld gaming machine embodying the present invention.

Depicted in FIG. 1*b* is a handheld or mobile gaming machine 110. Like the free standing gaming machine 10, the handheld gaming machine 110 is preferably an electromechanical gaming machine configured to play mechanical slots, any other game compatible with a display comprising at least one symbol-bearing reel strip. The handheld gaming machine 110 may also be a hybrid gaming machine integrating both electronic and electromechanical displays. The handheld gaming machine 110 comprises a housing or casing 112 and includes input devices, including a value input device 118 and a player input device 124. For output the handheld gaming machine 110 includes, but is not limited to, a primary display 114, a secondary display 116, one or more speakers 117, one or more player-accessible ports 119 (e.g., an audio output jack for headphones, a video headset jack, etc.), and other conventional I/O devices and ports, which may or may not be player-accessible. In the embodiment depicted in FIG. 1*b*, the handheld gaming machine 110 comprises a secondary display 116 that is rotatable relative to the primary display 114. The optional secondary display 116 may be fixed, movable, and/or detachable/attachable relative to the primary display 114. Either the primary display 114 and/or secondary display 116 may be configured to display any aspect of a non-wagering game, wagering game, secondary games, bonus games, progressive wagering games, group games, shared-experience games or events, game events, game outcomes, scrolling information, text messaging, emails, alerts or announcements, broadcast information, subscription information, and handheld gaming machine status.

The player-accessible value input device 118 may comprise, for example, a slot located on the front, side, or top of the casing 112 configured to receive credit from a stored-value card (e.g., casino card, smart card, debit card, credit card, etc.) inserted by a player. In another aspect, the player-accessible value input device 118 may comprise a sensor (e.g., an RF sensor) configured to sense a signal (e.g., an RF signal) output by a transmitter (e.g., an RF transmitter) carried by a player. The player-accessible value input device 118 may also or alternatively include a ticket reader, or barcode scanner, for reading information stored on a credit ticket, a card, or other tangible portable credit or funds storage device. The credit ticket or card may also authorize access to a central account, which can transfer money to the handheld gaming machine 110.

Still other player-accessible value input devices 118 may require the use of touch keys 130 on the touch-screen display (e.g., primary display 114 and/or secondary display 116) or player input devices 124. Upon entry of player identification information and, preferably, secondary authorization information (e.g., a password, PIN number, stored value card number, predefined key sequences, etc.), the player may be permitted to access a player's account. As one potential optional security feature, the handheld gaming machine 110 may be configured to permit a player to only access an account the player has specifically set up for the handheld gaming machine 110. Other conventional security features may also be utilized to, for example, prevent unauthorized access to a player's account, to minimize an impact of any unauthorized access to a player's account, or to prevent unauthorized access to any personal information or funds temporarily stored on the handheld gaming machine 110.

The player-accessible value input device 118 may itself comprise or utilize a biometric player information reader which permits the player to access available funds on a player's account, either alone or in combination with another of the aforementioned player-accessible value input devices 118. In an embodiment wherein the player-accessible value input device 118 comprises a biometric player information reader, transactions such as an input of value to the handheld device, a transfer of value from one player account or source to an account associated with the handheld gaming machine 110, or the execution of another transaction, for example, could all be authorized by a biometric reading, which could comprise a plurality of biometric readings, from the biometric device.

Alternatively, to enhance security, a transaction may be optionally enabled only by a two-step process in which a secondary source confirms the identity indicated by a primary source. For example, a player-accessible value input device 118 comprising a biometric player information reader may require a confirmatory entry from another biometric player information reader 152, or from another source, such as a credit card, debit card, player ID card, fob key, PIN number, password, hotel room key, etc. Thus, a transaction may be enabled by, for example, a combination of the personal identification input (e.g., biometric input) with a secret PIN number, or a combination of a biometric input with a fob input, or a combination of a fob input with a PIN number, or a combination of a credit card input with a biometric input. Essentially, any two independent sources of identity, one of which is secure or personal to the player (e.g., biometric readings, PIN number, password, etc.) could be utilized to provide enhanced security prior to the electronic transfer of any funds. In another aspect, the value input device 118 may be provided remotely from the handheld gaming machine 110.

The player input device 124 comprises a plurality of push buttons on a button panel for operating the handheld gaming machine 110. In addition, or alternatively, the player input device 124 may comprise a touch screen 128 mounted to a primary display 114 and/or secondary display 116. In one aspect, the touch screen 128 is matched to a display screen having one or more selectable touch keys 130 selectable by a user's touching of the associated area of the screen using a finger or a tool, such as a stylus pointer. A player enables a desired function either by touching the touch screen 128 at an appropriate touch key 130 or by pressing an appropriate push button 126 on the button panel. The touch keys 130 may be used to implement the same functions as push buttons 126. Alternatively, the push buttons 126 may provide inputs for one aspect of the operating the game, while the touch keys 130 may allow for input needed for another aspect of the game. The various components of the handheld gaming machine 110 may be connected directly to, or contained within, the casing 112, as seen in FIG. 1*b*, or may be located outboard of the casing 112 and connected to the casing 112 via a variety of hardwired (tethered) or wireless connection methods. Thus, the handheld gaming machine 110 may comprise a single unit or a plurality of interconnected parts (e.g., wireless connections) which may be arranged to suit a player's preferences.

The operation of the basic wagering game on the handheld gaming machine 110 is displayed to the player on the primary display 114. The primary display 114 can also display the bonus game associated with the basic wagering game. The primary display 114 preferably includes a number of mechanical reels to display the outcome in visual association with at least one payline. Alternatively, the primary display 114 may take the form of a hybrid display incorporating both electromechanical display components, such as reels, with an electronic display, which may include a high resolution LCD, a plasma display, an LED, or any other type of display suitable for use in the handheld gaming machine 110. The size of the primary display 114 may vary from, for example, about a 2-3" display to a 15" or 17" display. In at least some aspects, the primary display 114 is a 7"-10" display. As the weight of and/or power requirements of such displays decreases with improvements in technology, it is envisaged that the size of the primary display may be increased. Optionally, coatings or removable films or sheets may be applied to the display to provide desired characteristics (e.g., anti-scratch, anti-glare, bacterially-resistant and anti-microbial films, etc.). In at least some embodiments, the primary display 114 and/or secondary display 116 may have a 16:9 aspect ratio or other aspect ratio (e.g., 4:3). The primary display 114 and/or secondary display 116 may also each have different resolutions, different color schemes, and different aspect ratios.

As with the free standing gaming machine 10, a player begins play of the basic wagering game on the handheld gaming machine 110 by making a wager (e.g., via the value input device 118 or an assignment of credits stored on the handheld gaming machine via the player input device 124, e.g. the touch screen keys 130 or push buttons 126) on the handheld gaming machine 110. In at least some aspects, the basic game may comprise a plurality of symbols arranged in an array, and includes at least one payline 132 that indicates one or more outcomes of the basic game. Such outcomes are randomly selected in response to the wagering input by the player. At least one of the plurality of randomly selected outcomes may be a start-bonus outcome, which can include any variations of symbols or symbol combinations triggering a bonus game.

In some embodiments, the player-accessible value input device 118 of the handheld gaming machine 110 may double as a player information reader 152 that allows for identification of a player by reading a card with information indicating the player's identity (e.g., reading a player's credit card, player ID card, smart card, etc.). The player information reader 152 may alternatively or also comprise a bar code scanner, RFID transceiver or computer readable storage medium interface. In one presently preferred aspect, the player information reader 152, shown by way of example in FIG. 1*b*, comprises a biometric sensing device.

Figure 2:
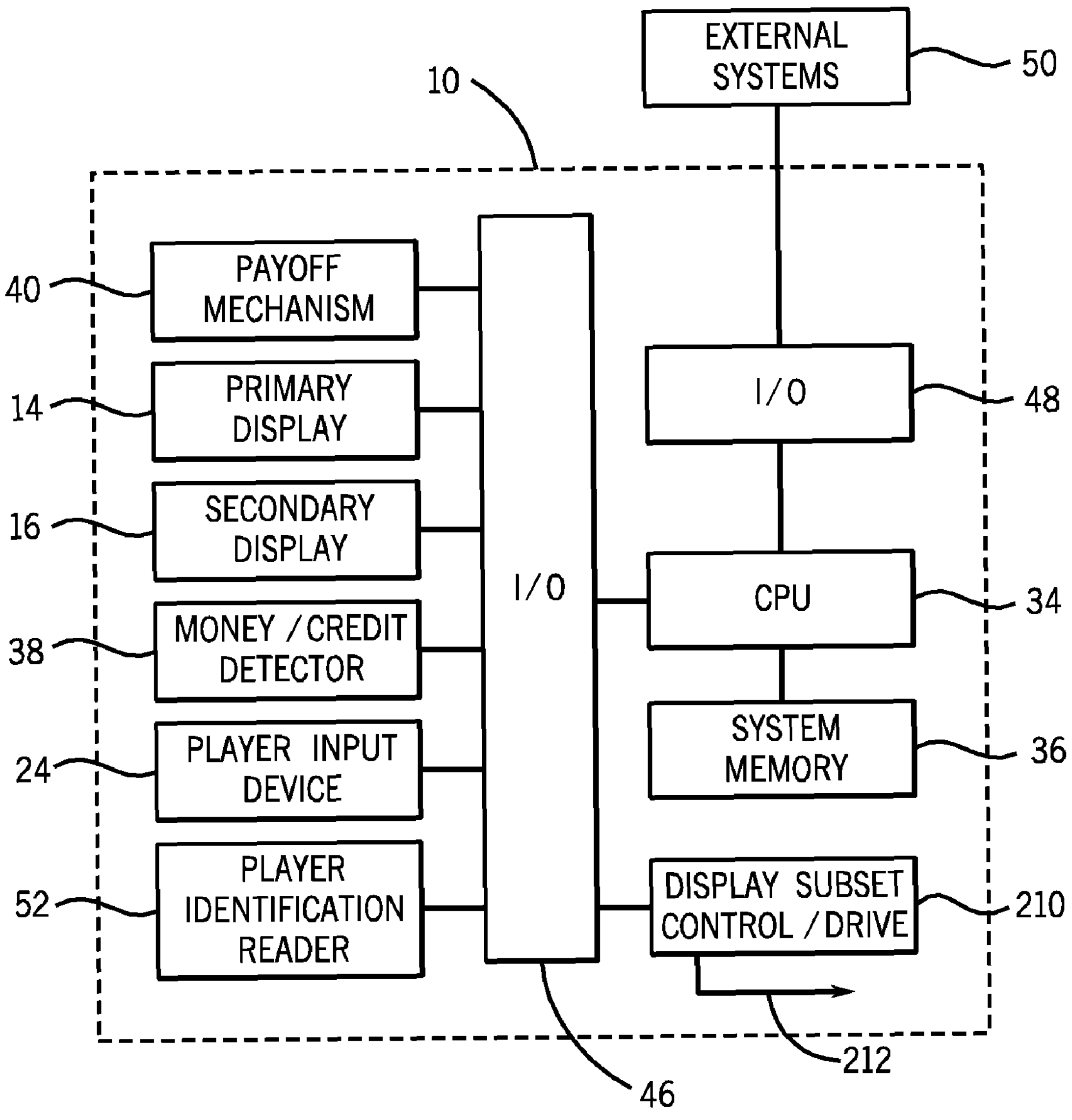
FIG. 2 is a block diagram of a control system suitable for operating the gaming machines of FIGS. 1*a* and 1*b;*

Turning now to FIG. 2, the various components of the gaming machine 10 are controlled by a central processing unit (CPU) 34, also referred to herein as a controller or processor (such as a microcontroller or microprocessor). To provide gaming functions, the controller 34 executes one or more game programs stored in a computer readable storage medium, in the form of memory 36. The controller 34 performs the random selection (using a random number generator (RNG)) of an outcome from the plurality of possible outcomes of the wagering game. Alternatively, the random event may be determined at a remote controller. The remote controller may use either an RNG or pooling scheme for its central determination of a game outcome. It should be appreciated that the controller 34 may include one or more microprocessors, including but not limited to a master processor, a slave processor, and a secondary or parallel processor.

The controller 34 is also coupled to the system memory 36 and a money/credit detector 38. The system memory 36 may comprise a volatile memory (e.g., a random-access memory (RAM)) and a non-volatile memory (e.g., an EEPROM). The system memory 36 may include multiple RAM and multiple program memories. The money/credit detector 38 signals the processor that money and/or credits have been input via the value input device 18. Preferably, these components are located within the housing 12 of the gaming machine 10. However, as explained above, these components may be located outboard of the housing 12 and connected to the remainder of the components of the gaming machine 10 via a variety of different wired or wireless connection methods.

As seen in FIG. 2, the controller 34 is also connected to, and controls, the primary display 14, the player input device 24, and a payoff mechanism 40. The controller 34 is also connected to a display subset control/drive element 210 which allows the controller 34 to selectably cause one or more portions of the primary display 14 to be concealed. As described further in connection with FIGS. 3-5, display subset control/drive element 210 provides a signal 212 for use by components of primary display 14 to perform the concealing function. The payoff mechanism 40 is operable in response to instructions from the controller 34 to award a payoff to the player in response to certain winning outcomes that might occur in the basic game or the bonus game(s). The payoff may be provided in the form of points, bills, tickets, coupons, cards, etc. For example, in FIG. 1*a*, the payoff mechanism 40 includes both a ticket printer 42 and a coin outlet 44. However, any of a variety of payoff mechanisms 40 well known in the art may be implemented, including cards, coins, tickets, smartcards, cash, etc. The payoff amounts distributed by the payoff mechanism 40 are determined by one or more pay tables stored in the system memory 36.

Communications between the controller 34 and both the peripheral components of the gaming machine 10 and external systems 50 occur through input/output (I/O) circuits 46, 48. More specifically, the controller 34 controls and receives inputs from the peripheral components of the gaming machine 10 through the input/output circuits 46. Further, the controller 34 communicates with the external systems 50 via the I/O circuits 048 and a communication path (e.g., serial, parallel, IR, RC, 10bT, etc.). The external systems 50 may include a gaming network, other gaming machines, a gaming server, communications hardware, or a variety of other interfaced systems or components. Although the I/O circuits 46, 48 may be shown as a single block, it should be appreciated that each of the I/O circuits 46, 48 may include a number of different types of I/O circuits.

Controller 34, as used herein, comprises any combination of hardware, software, and/or firmware that may be disposed or resident inside and/or outside of the gaming machine 10 that may communicate with and/or control the transfer of data between the gaming machine 10 and a bus, another computer, processor, or device and/or a service and/or a network. The controller 34 may comprise one or more controllers or processors. In FIG. 2, the controller 34 in the gaming machine 10 is depicted as comprising a CPU, but the controller 34 may alternatively comprise a CPU in combination with other components, such as the I/O circuits 46, 48 and the system memory 36. The controller 34 may reside partially or entirely inside or outside of the machine 10. The control system for a handheld gaming machine 110 may be similar to the control system for the free standing gaming machine 10 except that the functionality of the respective on-board controllers may vary.

The gaming machines 10, 110 may communicate with external systems 50 (in a wired or wireless manner) such that each machine operates as a "thin client," having relatively less functionality, a "thick client," having relatively more functionality, or through any range of functionality therebetween. As a generally "thin client," the gaming machine may operate primarily as a display device to display the results of gaming outcomes processed externally, for example, on a server as part of the external systems 50. In this "thin client" configuration, the server executes game code and determines game outcomes (e.g., with a random number generator), while the controller 34 on board the gaming machine processes display information to be displayed on the display(s) of the machine. In an alternative "thicker client" configuration, the server determines game outcomes, while the controller 34 on board the gaming machine executes game code and processes display information to be displayed on the display(s) of the machines. In yet another alternative "thick client" configuration, the controller 34 on board the gaming machine 110 executes game code, determines game outcomes, and processes display information to be displayed on the display(s) of the machine. Numerous alternative configurations are possible such that the aforementioned and other functions may be performed onboard or external to the gaming machine as may be necessary for particular applications. It should be understood that the gaming machines 10, 110 may take on a wide variety of forms such as a free standing machine, a portable or handheld device primarily used for gaming, a mobile telecommunications device such as a mobile telephone or personal daily assistant (PDA), a counter top or bar top gaming machine, or other personal electronic device such as a portable television, MP3 player, entertainment device, etc.

Figure 3:
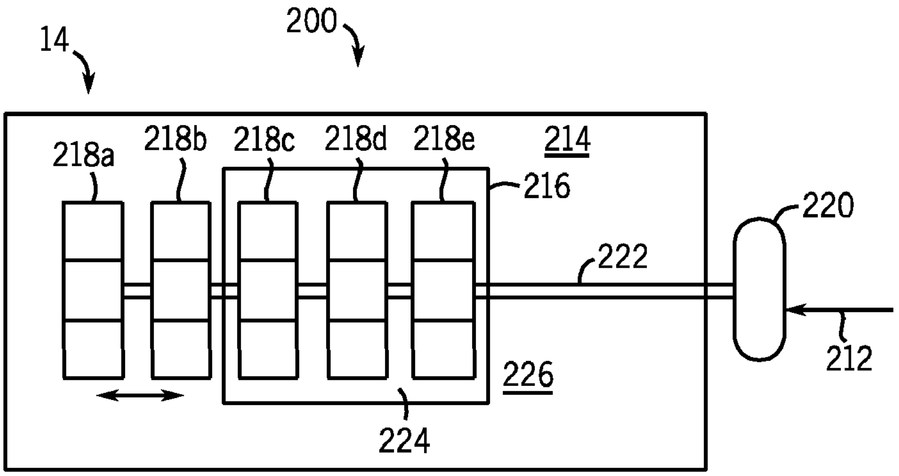
FIG. 3 is a block diagram of a first embodiment of a display arrangement for use with gaming machines according to an aspect of the invention, in which portions of the display are selectably concealed by moving one or more reel strips with respect to a reel glass and reel window combination.

Turning now to FIG. 3, according to an aspect of the invention, there is shown a block diagram of a first embodiment 200 of a display arrangement for use with the gaming machines 10 and 110, in which portions of the display are selectably concealed by moving one or more reel strips with respect to a reel glass and reel window combination.

As best seen in FIG. 3, the primary display 14 preferably includes a plurality of reel strips 218*a*-218*e*, reel glass 214, and a reel window 216. Although five reel strips are depicted in FIG. 3, this number is not critical, and any practical number of reel strips could be used. In some embodiments of a gaming machine constructed according to an aspect of the invention, the gaming machine may incorporate a reel strip arrangement similar to that of traditional electro-mechanical gaming machines, in which each reel strip is mounted on a generally cylindrical reel arranged for controlled rotation about an approximately common axis, and each of the reels and reel strips are located at different places along the axis, which is often parallel to the floor and to the front of the machine. However, other reel strip and reel arrangements could also be used. For example, instead of being mounted on reels, the reel strips could be arranged as conveyor-like belts and supported or driven by one or more capstans.

Each reel strip preferably bears at least one, and typically several, gaming symbols associated with one or more defined game modes implemented by the gaming machine 10 via controller 34. A change in game mode may be initiated by the operator or a craftsperson, for example to cause the gaming machine to present to users a different game or theme. This change may be initiated using a control panel of the gaming machine, or if the gaming machine is networked or interfaced as part of a gaming machine system, the change may be initiated via the network or interface. Alternatively, a change in game mode could be initiated by the player, or the controller, for example to present a new or different game, theme, game episode, game level, game character, a bonus reel or round, or the like.

Reel glass 214 provides a separation between a game player and the internal components of the gaming machine 10, and allows portions of the primary display 14 to be viewed. Reel glass 214 may be constructed of glass, minerals, resin, composite, or other appropriate materials, and may be an assembly including transparent and non-transparent materials. Reel glass 214 preferably includes at least one reel window 216 providing a translucent or transparent region 224 through which portions of the primary display 14 may be viewed. Outside the reel window or windows 216 is a generally opaque or partially opaque region 226, which conceals those portions of the primary display 14 which are not intended to be viewable at a particular time. The opaque region 226 may also serve to conceal the internal components of the machine, and may furnish invariant elements of the display, such as game instructions, legends, and the like. As best seen in FIG. 3, reel glass 214 and reel window 216 may occupy a fixed position, and in the configuration shown, conceal two reel strips 218*a* and 218*b*, and allows three reel strips, 218*c*, 218*d*, and 218*e*, to be viewed.

As best seen in FIG. 3, the reel strips 218*a*-218*e* are preferably mounted on a carriage, an element of which is shown as 222, for movement in a direction parallel to the reel axis. The primary display 14 preferably further includes a display subset selection actuator 220 coupled to carriage 222 to control the axial position of the reel strips. The display subset selection actuator 220 may be implemented using any appropriate technology, including but not limited to a regular motor, a stepper motor, a solenoid, or the like. The display subset selection actuator 220 is controlled by controller 34 via a display subset control signal 212. By moving the reel strip carriage 222, the controller 34 can select which reel strips are concealed and which reel strips are visible, subject to the configuration of the reel window or windows 216. Thus, to conceal reel strips 218*d* and 218*e*, and render visible reel strips 218*a*, 218*b*, and 218*c*, controller 34 may cause display subset selection actuator 220 to index the display subset carriage 222 two positions to the right. For the purpose of this application, the term "reel strip" is intended to include any portion of a reel strip usefully addressable by the reel windows, regardless of shape or physical realization, including without limitation columns, tracks, or rows thereof.

Although only a single reel window 216 is shown in FIG. 3, other reel window configurations could also be used. For example, multiple interleaved reel windows could be provided, and reel windows may have shapes chosen to allow fractional portions of reels to be concealed or visible. An example of this is shown in FIGS. 9-12 (discussed further in greater detail), in which three reel strips are provided, each having left and right sections. Three interleaved reel windows allow either the right sections of the reels or the left sections of the reels to be visible.

Controller 34 preferably implements at least two defined game modes, each of which are associated with a subset of the available reel strips, which subset may include all reel strips and need not be exclusive. Different game modes may correspond to completely different games, different modes, phases, or themes of the same game (e.g., a bonus round, a sport theme, or the addition of a character), different episodes of a game or a narrative associated therewith, or the like. These particular mode applications are mentioned as examples, but those skilled in the art will appreciate that the plural game modes may be applied in a wide variety of ways consistent with the spirit of the present invention. Thus, the symbols on addressable reel strips may be related, or may be entirely unrelated, depending on how the available game modes are defined. The available reel strip subsets are constrained by the configuration of the reel strips and the reel windows. For example, in FIG. 3, subsets containing any three adjacent reels may be selected, as well as subsets containing 2 or 1 adjacent end-most reels.

Figure 4:
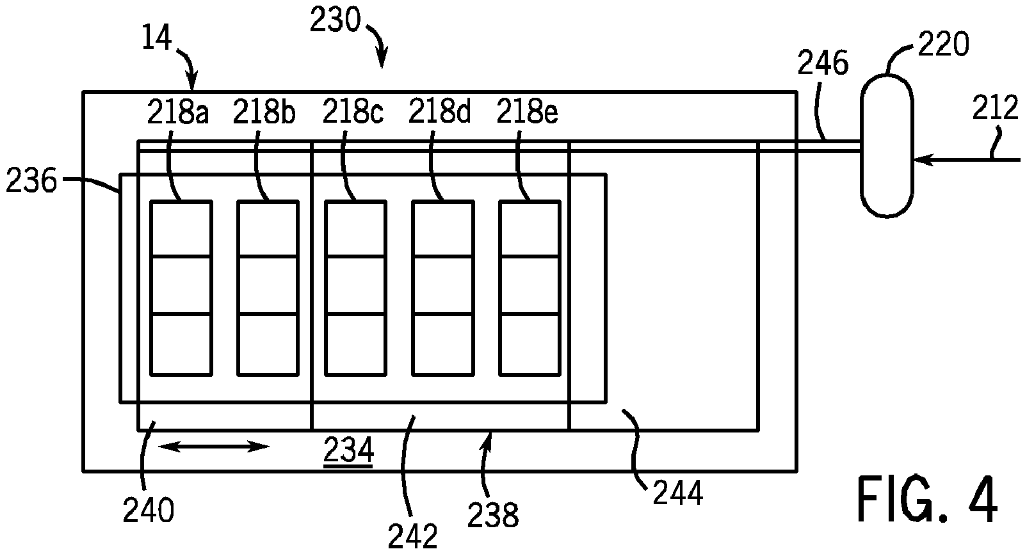
FIG. 4 is a block diagram of a second embodiment of a display arrangement in which portions of the display are selectably concealed by moving a reel glass with respect to one or more reel strips.

Turning now to FIG. 4, according to a further aspect of the invention, there is shown a block diagram of a second embodiment 230 of a display arrangement for use with the gaming machines 10 and 110, in which portions of the display are selectably concealed by moving a reel window with respect to one or more reel strips. The embodiment 230 FIG. 4 may be constructed and used in the same manner as the embodiment 200 of FIG. 3, except as described below.

In order to selectably conceal one or more reel strips, reel glass 234 incorporates a large, fixed, first reel window 236 that reveals all of the reel strips 218*a*-218*e*, layered with a second movable reel window 238, which may either overlay or underlie the first reel window 236. The movable reel window 238 preferably includes one or more transparent regions 242 allowing the reels strips behind to be viewed, and one or more opaque regions 240, 244, that conceal the regions below or behind. Thus, the movable reel window 238 selectably conceals one or more of the reel strips that would otherwise be rendered visible by the larger fixed reel window 236. The reel windows 236 and 238 may be overlaid in any appropriate manner. Movable reel window 238 is arranged for slidable movement in a direction generally parallel to the reel axis. Movable reel window 238 is coupled to display subset selection actuator 220 via a reel window carriage 246. The display subset selection actuator 220 is controlled by controller 34 via a display subset control signal 212. By moving the reel window carriage 246, the controller 34 can select which reel strips are concealed and which reel strips are visible, subject to the configuration of the movable reel window or windows 238. The embodiment 230 shown in FIG. 4 provides similar features and advantages, allows the use of similar alternatives, and is subject to constraints similar to those described for the embodiment 200 of FIG. 3.

Figure 5:
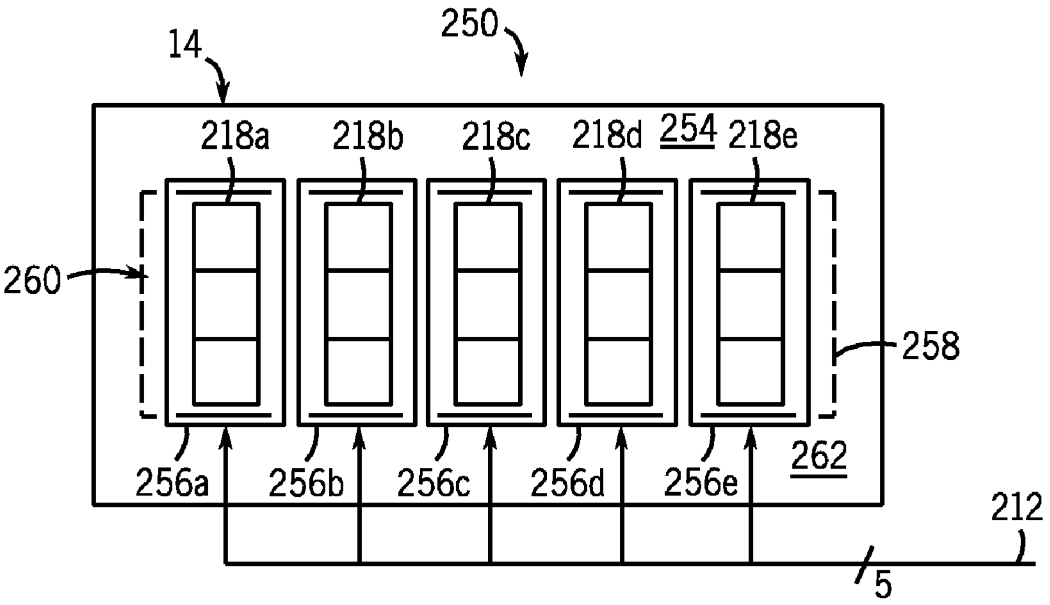
FIG. 5 is a block diagram of a third embodiment of a display arrangement in which portions of the display are selectably concealed using one or more controllable-opacity segments.

Turning now to FIG. 5, in accord with a further aspect of the invention, there is shown a block diagram of a third embodiment 250 of a display arrangement for use with the gaming machines 10 and 110, in which portions of the display are selectably concealed using one or more controllable-opacity segments.

The primary display 14 of embodiment 250 preferably includes a plurality of reel strips 218*a*-218*e* and a reel glass 254. An optional reel window 258 may also be included. The reel window 258 may have a transparent region 260 and an opaque or partially-opaque region 262. The transparent region 260 is preferably large enough to allow all of the reel strips 218*a*-218*e* to be viewed. The opaque region 262 may optionally be used to display graphics or artwork thematically associated with a wagering game.

Primary display 14 preferably further includes one or more controllable opacity segments, e.g., 256*a*-256*e*, arranged to selectably conceal or reveal one or more of reel strips 218*a*-218*e*. The controllable opacity segments 256*a*-256*e* are controlled by controller 34 via a display subset control signals 212, which may be realized using one or several signal leads, a bus, serial link, network link, or any other appropriate link or signal.

As best seen in FIG. 5, embodiment 250 has five controllable opacity segments 256*a*-256*e*, each corresponding to a respective one of the reel strips 218*a*-218*e*. Each of the controllable opacity segments 256*a*-256*e* is shown, by way of example but not limitation, as having a generally rectangular shape to conceal the respective reel strip. However, any suitable number or shape of controllable opacity segments could also be employed, and the term "segment" as used herein may include any number or combination of physical segments or pixels that may be used to selectably conceal one or more reel strips. Although providing an individual controllable opacity segment for each reel strip provides great flexibility, some applications may not require such an individual association. For example, it may be sufficient to selectably conceal two individually-controllable groups of reel strips. The controllable opacity segments may be implemented using one or more transmissive liquid-crystal panels, or any other appropriate technology. An example of an appropriate technology for implementing the controllable opacity segments is disclosed in U.S. Pat. No. 6,517,433 to Loose et. al., which is assigned to WMS Gaming Inc. In some embodiments, the controllable opacity segments, or portions thereof, may also serve as a display element, such that the display space ordinarily occupied by a reel strip may, when the reel strip is concealed, be replaced with functional or ornamental content. In an embodiment, the reel window 258 is not included, and the selection of which reels 281 are viewable is accomplished entirely by the controllable opacity segments 256. Moreover, the plurality of controllable opacity segments 256 may comprise a single unified element having controllable sub-regions, such as the transmissive LCD display described in Loose et. al.

Figure 6:
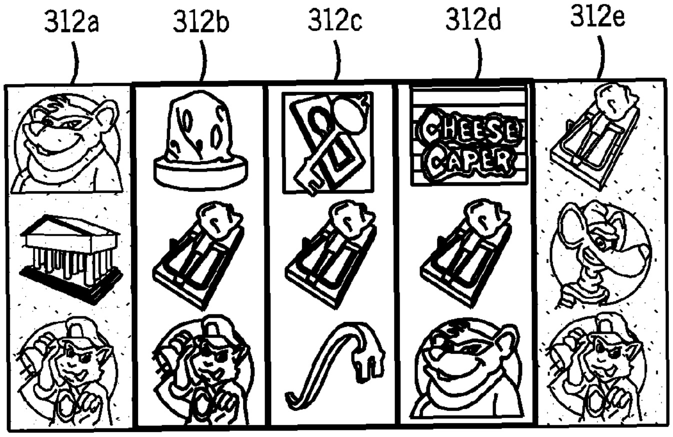
FIG. 6 is a representation of the primary display showing a first selection of reel strips.
Figure 7:
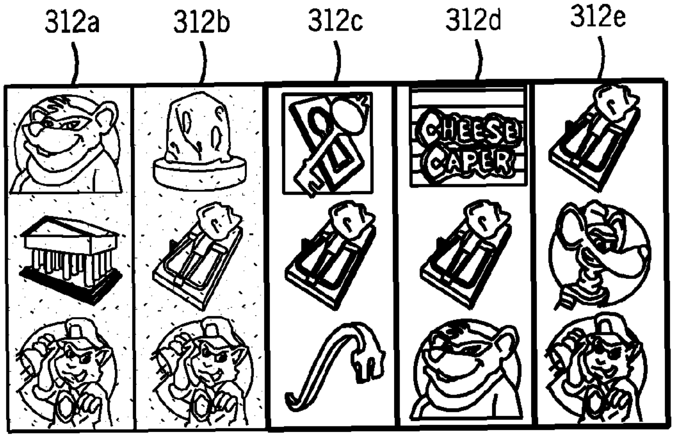
FIG. 7 is a representation of the primary display showing a second selection of reel strips.
Figure 8:
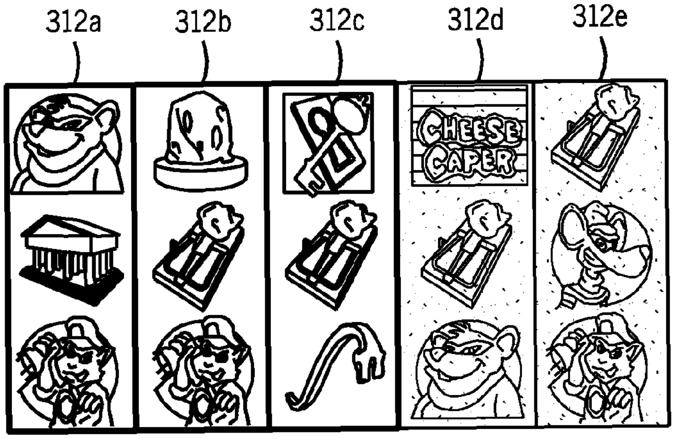
FIG. 8 is a representation of the primary display showing a third selection of reel strips.

FIGS. 6, 7, and 8 are representations of the primary display showing first, second, and third selections of reel strips as they might appear in a gaming machine using one of the embodiments 200, 230, or 250 of FIGS. 3-5. In FIGS. 6-8, each subset of reels which is selected to be visible contains a group of three adjacent reels, and the subsets are non-exclusive (i.e., they overlap). Because there is some commonality of reel strips among the subsets, this arrangement may be most suitable for applications in which the different game modes correspond to different parts, episodes, phases, or other subdivisions of a game or theme, in which some commonality of symbols between game modes is acceptable. However, the arrangement could be used in other applications.

As best seen in FIG. 6, which may correspond to a first game mode, display 310 has reel strips 312*a* and 312*e* concealed, and reel strips 312*b*, 312*c*, and 312*d* visible. This corresponds to a centered alignment of the reel window with the reel strips in the embodiments of FIGS. 3 and 4, and to the two outermost segments operating in the opaque mode in the embodiment of FIG. 5.

As best seen in FIG. 7, which may correspond to a second game mode, display 330 has reel strips 312*a* and 312*b* concealed, and reel strips 312*c*, 312*d*, and 312*e* visible. This corresponds to an alignment of the reel strips indexed one space to the left of center in the embodiment of FIG. 3, and alignment of the reel window indexed one space to the right of center in the embodiment of FIG. 4, and to the two leftmost segments operating in the opaque mode in the embodiment of FIG. 5.

As best seen in FIG. 8, which may correspond to a third game mode, display 340 has reel strips 312*d* and 312*e* concealed, and reel strips 312*a*, 312*b*, and 312*c* visible. This corresponds to an alignment of the reel strips indexed one space to the right of center in the embodiment of FIG. 3, and alignment of the reel window indexed one space to the left of center in the embodiment of FIG. 4, and to the two rightmost segments operating in the opaque mode in the embodiment of FIG. 5.

FIGS. 9-12 are representations of the primary display showing fourth, fifth, sixth, and seventh selections of reel strips as they might appear in a gaming machine using the embodiment 250 of FIG. 5 after modification to provide a sixth reel strip and controllable opacity segment, or the embodiments 200 or 230 of FIG. 3 or FIG. 4 after modification to provide six reel strips and three interleaved reel windows.

In FIGS. 9-12, each subset of reels which is selected to be visible contains a group of three interleaved, or alternating reels, and the subsets are exclusive (i.e., they do not overlap). Because there is no commonality of reel strips among the subsets, this arrangement may be suitable for both applications in which the different game modes correspond to different parts, episodes, phases, or other subdivisions of a game or theme, and applications in which the different game modes correspond to different games or subdivisions thereof that do not share symbols or reel strips. The use of interleaved reel strips and reel windows allows multiple reel strips to be implemented on each physical reel, if desired. In that configuration, a reel strip corresponding to each game mode is located in a corresponding position on each physical reel, as defined by the spacing of the reel windows. This advantageously reduces the number of physical reels and reel drive components that must be implemented.

Figure 9:
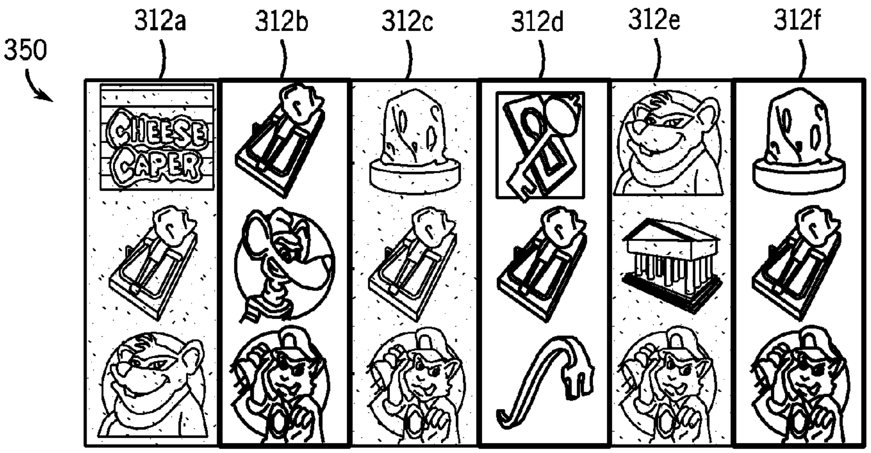
FIG. 9 is a representation of the primary display showing a fourth selection of reel strips.
Figure 10:
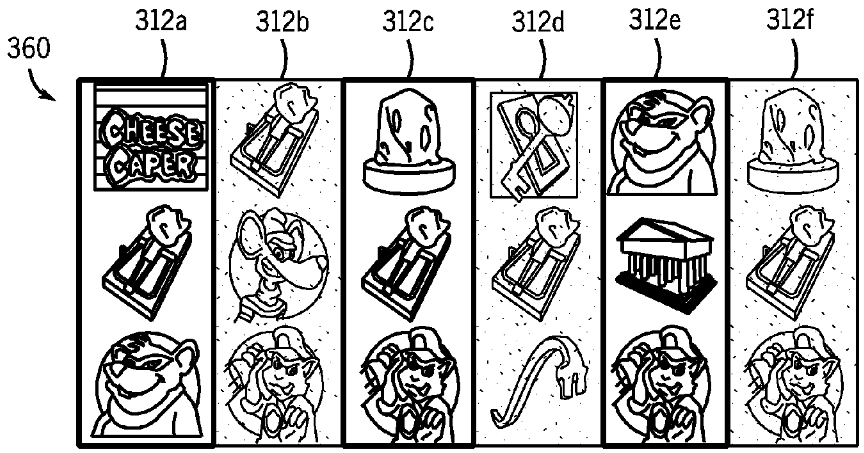
FIG. 10 is a representation of the primary display showing a fifth selection of reel strips.

As best seen in FIGS. 9 and 10, the two subsets of reel strips correspond to first and second game modes employing similar symbols. In FIG. 9, corresponding to a first game mode, display 350 has reel strips 312*a*, 312*c*, and 312*e* concealed, and reel strips 312*b*, 312*d*, and 312*f* visible. In FIG. 10, corresponding to a second game mode, display 360 has reel strips 312*a*, 312*c*, and 312*e* visible, and reel strips 312*b*, 312*d*, and 312*f* concealed. To transition from the displays of FIG. 9 to FIG. 10, the embodiment of FIG. 3 would index the reel strips to the right, the embodiment of FIG. 4 would index the reel windows to the left, and the embodiment of FIG. 5 would activate the opaque mode for the segments corresponding to reel strips 312*b*, 312*d*, and 312*f* and eliminate the opaque mode for the segments corresponding to reel strips 312*a*, 312*c*, and 312*e*, thereby making them visible.

Figure 11:
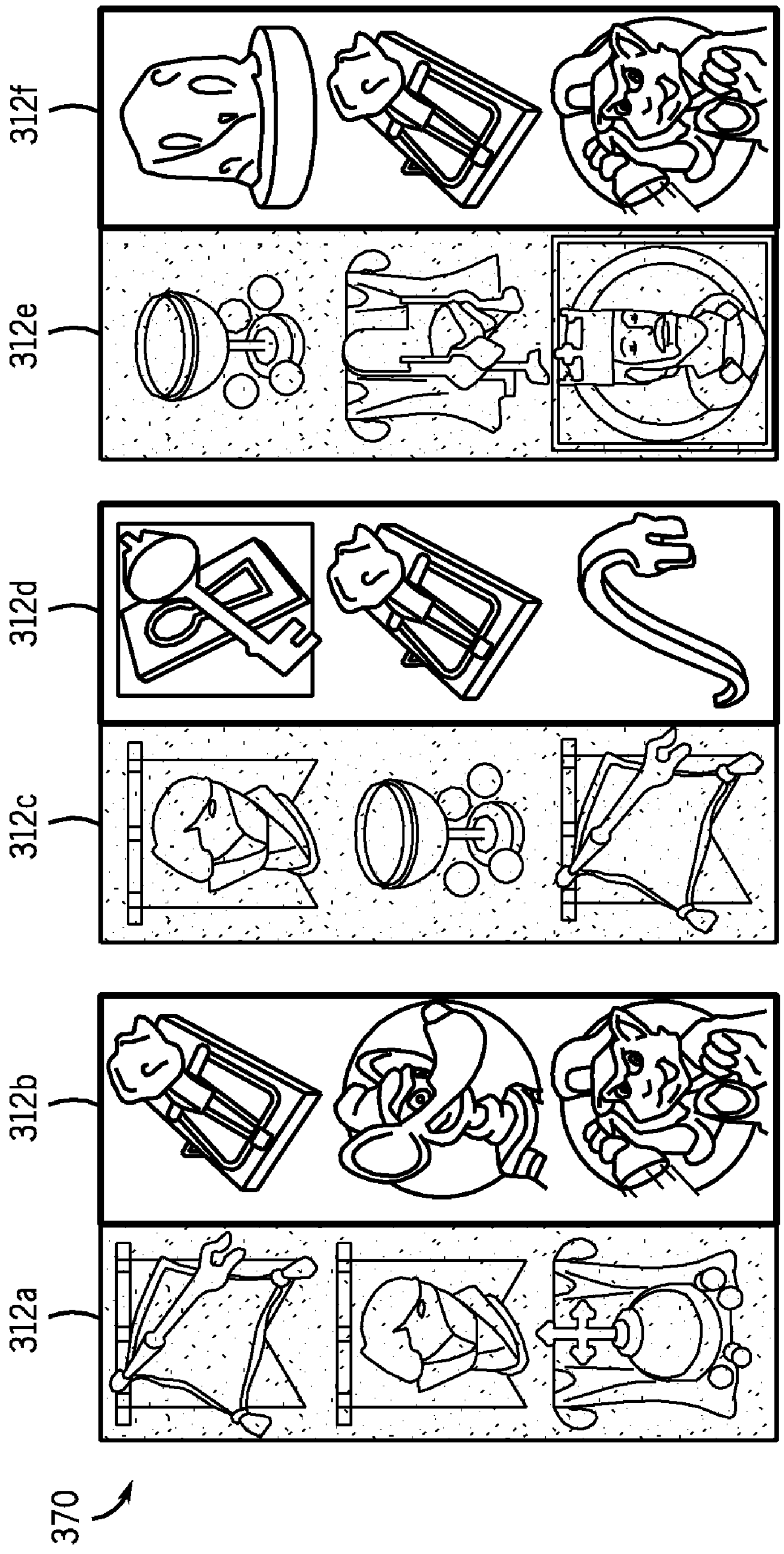
FIG. 11 is a representation of the primary display showing a sixth selection of reel strips.
Figure 12:
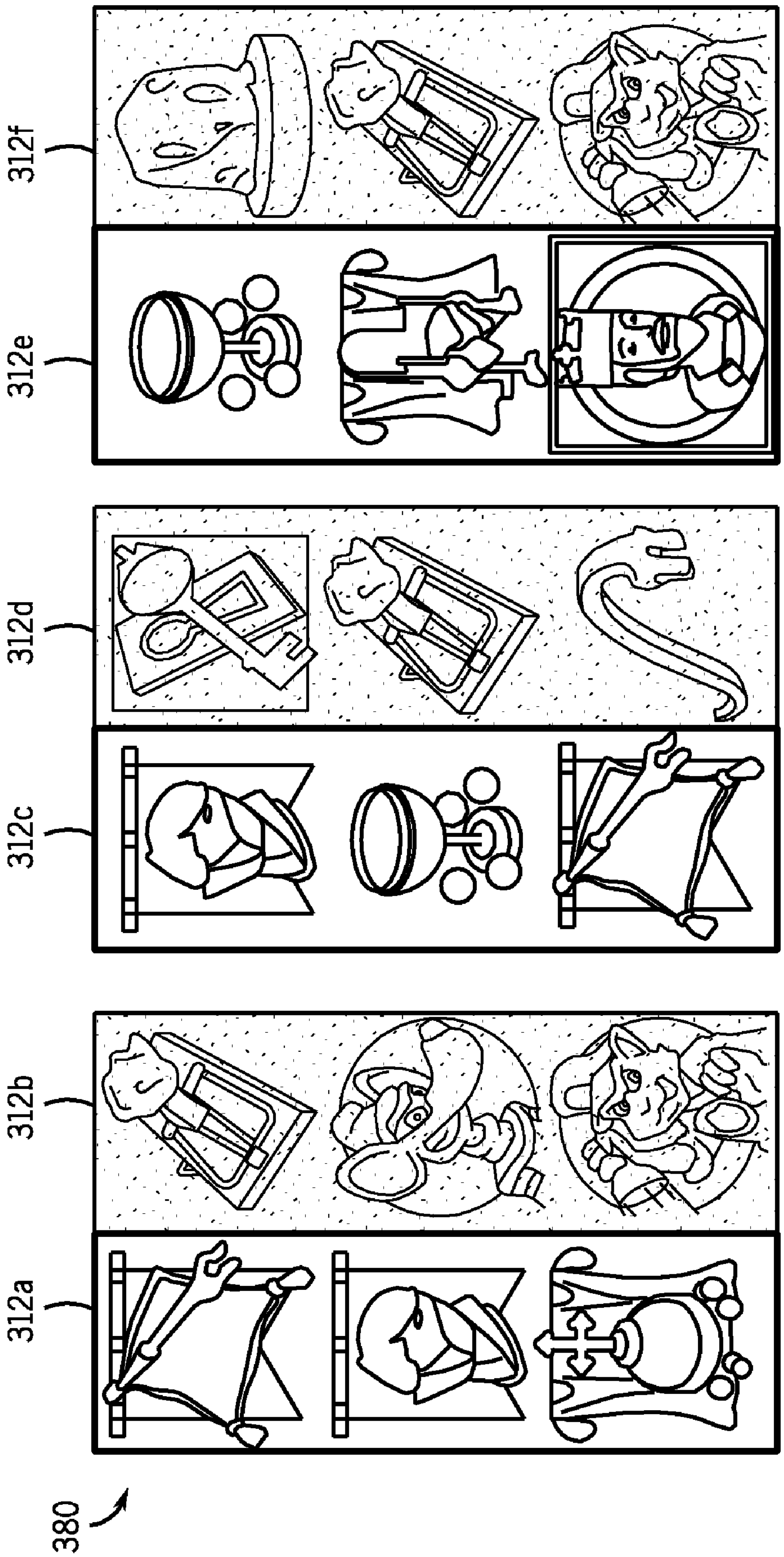
FIG. 12 is a representation of the primary display showing a seventh selection of reel strips.

As best seen in FIGS. 11 and 12, the two subsets of reel strips correspond to first and second game modes employing differing symbols. For example, the first game mode might correspond to a "Cheese Caper" game, and the second game mode might correspond to a "Royal Treasures" game. In FIG. 11, corresponding to a first game mode, display 370 has reel strips 312*a*, 312*c*, and 312*e* concealed, and reel strips 312*b*, 312*d*, and 312*f* (showing the "Cheese Caper" game symbols) visible. In FIG. 12, corresponding to a second game mode, display 380 has reel strips 312*b*, 312*d*, and 312*f* concealed and reel strips 312*a*, 312*c*, and 312*e* (showing the "Royal Treasures" game symbols) visible. To transition from the displays of FIG. 11 to FIG. 12, the embodiment of FIG. 3 would index the reel strips to the right, the embodiment of FIG. 4 would index the reel windows to the left, and the embodiment of FIG. 5 would activate the opaque mode for the segments corresponding to reel strips 312*b*, 312*d*, and 312*f* and inhibit the opaque mode for the segments corresponding to reel strips 312*a*, 312*c*, and 312*e*.

Figure 13:
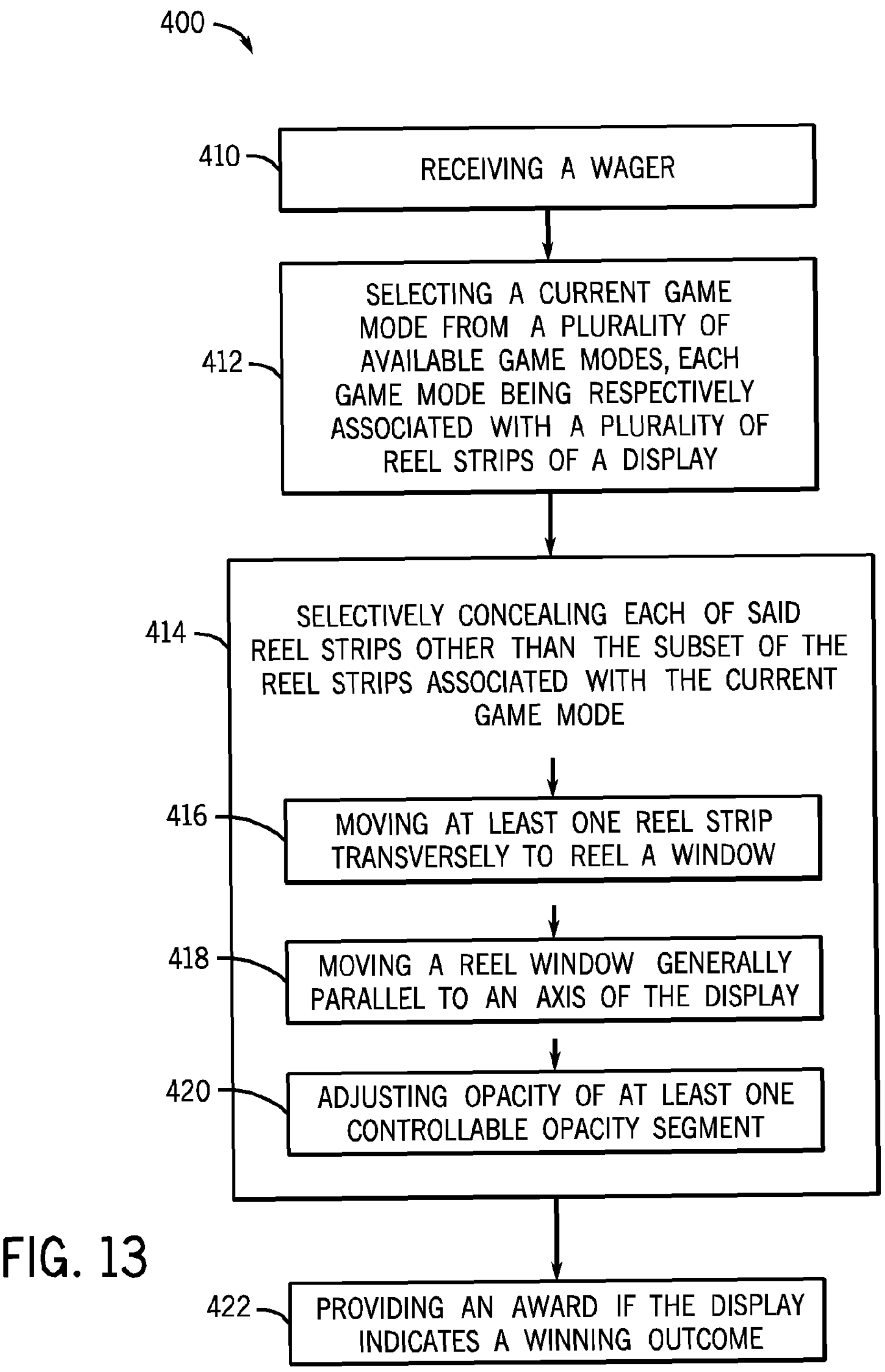
FIG. 13 is a flow diagram depicting the steps of a method for operating a wagering game.

In accord with a further aspect of the present invention, there is shown in FIG. 13 a flow diagram depicting the steps of a method 400 for operating a wagering game, for use with the gaming machines 10, 110 of FIGS. 1-2.

In step 410, the gaming machine 10 or 110 receives a wager via a wager input device. In step 412, the controller selects a current game mode from a plurality of available game modes, each game mode being respectively associated with a plurality of reel strips of a display.

In step 414, the controller selectively conceals each of the reel strips other than that subset of reel strips associated with the current game mode. Substeps 416, 418 and 420 may define how step 414 is implemented, depending on the presence of the selective concealment apparatus of FIGS. 3, 4, and 5, respectively. As such, substeps 416, 418, and 420 are optional, and alternative ways of accomplishing step 414. If the apparatus of FIG. 3 is present, substep 416 may be executed, in which the controller moves at least one reel strip transversely to a reel window. If the apparatus of FIG. 4 is present, substep 418 may be executed, in which the controller moves a reel window generally parallel to an axis of the display. If the apparatus of FIG. 5 is present, substep 420 may be executed, in which the controller adjusts the opacity of at least one controllable opacity segment of the display.

In step 422, the controller provides an award if the display indicates a winning outcome, completing the operation of the method 400 with gaming machine 10 or 110.

Figure 14:
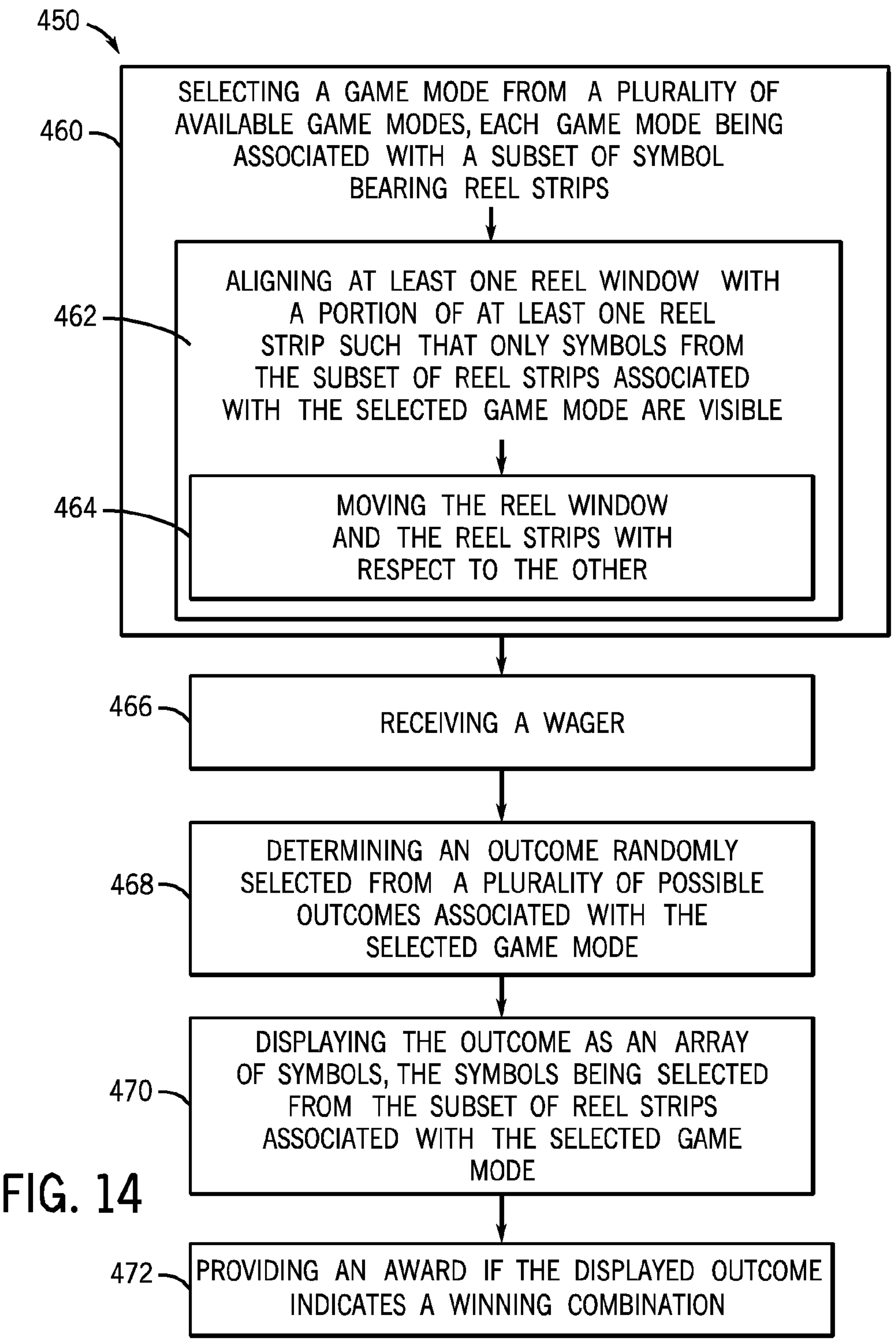
FIG. 14 is a flow diagram depicting the steps of a method for conducting a wagering game on a gaming system.

In accordance with a further aspect of the present invention, there is shown in FIG. 14 a flow diagram depicting the steps of a method 450 for conducting a wagering game on a gaming system, for use with the gaming machines 10, 110 of FIGS. 1-2.

In step 460, the controller selects a game mode from a plurality of available game modes, each game mode being associated with a subset of symbol bearing reel strips forming part of the display of the gaming machine. Substep 462 is optional and may further define the implementation of step 460. In substep 462, the controller aligns at least one reel window with a portion of at least one reel strip such that only symbols from the subset of reel strips associated with the selected game mode are visible. Substep 464 is optional and may further define the implementation of substep 462. In substep 464, the controller moves one of the reel window and the reel strips with respect to the other to achieve the alignment referenced in substep 462.

In step 466, the gaming machine receives a wager via a wager input device.

In step 468, the controller determines an output randomly selected from a plurality of possible outcomes associated with the selected game mode. In step 470, the controller displays the outcome as an array of symbols which are selected from the subset of reel strips associated with the selected game mode.

In step 472, the controller provides an award if the displayed outcome indicates a winning combination, completing the operation of the method 450 with gaming machine 10 or 110.

One of skill in the art will appreciate that the specific apparatus and methods described heretofore are examples of embodiments of various aspects of the present invention, and that many alternatives and modifications may be employed consistent with the spirit of the invention, including but not limited to the following.

Although specific arrangements of reel strips with respect to one another, and with respect to the reel glass and reel windows, have been described, other arrangements could also be used. Also, although movements of reel windows and reel strips have been heretofore described as generally occurring along an axis parallel to the axis of the reels, movements in other directions could also achieve selective concealment of portions of reel strips to allow a gaming machine to selectably produce displays corresponding to different game modes, including without limitation different game episodes, game themes, and the like. For example, the reel strips or reel windows could be indexed in a substantially vertical direction, or in any other appropriate way.

The display subset selection actuators 220 which drive the position of the reel strips or the reel are described as coupled to the moving elements using a "carriage". This carriage could take any appropriate form, including but not limited to a lead screw, chain, cable, or belt drive, and the actuator may be located on a fixed element of the gaming machine 10, or 110 or on the carriage.

Those of skill in the art will appreciate that other embodiments, variations, modifications and alternatives may also be used.

Each of these embodiments and obvious variations thereof is contemplated as falling within the spirit and scope of the claimed invention, which is set forth in the following claims.

What is claimed is:

1. A gaming system comprising:

a wager input device;

a display for displaying a randomly selected outcome of a wagering game; and a controller operatively coupled to said display and said wager input device to operate in a plurality of selectable game modes of which a selected one is a current game mode;

said display having an array of reel strips, each of said selectable game modes being respectively associated with a subset of said reel strips of said array, a first game mode of said plurality of selectable game modes having at least one reel strip that differs from at least one reel strip of a second game mode of said plurality of selectable game modes, said second game mode having at least one reel strip that differs from at least one reel strip of said first game mode;

said controller operative to cause said display to selectively conceal each of said reel strips other than said subset of said reel strips associated with the current game mode.

2. The gaming system of claim 1, wherein said display further comprises a reel glass having at least one reel window adapted to selectably allow said subset of reel strips associated with the current game mode to be viewed.

3. The gaming system of claim 2 wherein said display selectably conceals reel strips not associated with the current game mode by moving said at least one reel window in a direction transverse to said reel strips.

4. The gaming system of claim 2, wherein each of said reel strips is arranged at a location along an axis of said display different from the locations of other reel strips and said display selectably conceals those reel strips not associated with the current game mode by moving said reel glass in a direction generally parallel to said axis.

5. The gaming system of claim 2, wherein each of said reel strips is arranged at a location along an axis of said display different from the locations of other reel strips and said display selectably conceals those reel strips not associated with the current game mode by moving said reel strips in a direction generally parallel to said axis.

6. The gaming system of claim 1, wherein said display further comprises at least one controllable-opacity segment responsive to said controller adapted to allow said subset of reel strips associated with the current game mode to be viewed and to conceal other reel strips.

7. The gaming system of claim 6, wherein said controllable-opacity segment comprises a transmissive-mode liquid crystal panel.

8. The gaming system of claim 1, wherein each of said reel strips bears a plurality of symbols relating to said wagering game, and said controller selects symbols of said reel strips to be displayed as said outcome.

9. The gaming system of claim 8, wherein said controller is further adapted to provide an award if said displayed symbols indicate a winning combination.

10. The gaming system of claim 1, wherein, for each of said game modes, at least two members of said subset of reel strips associated with such game mode are adjacent.

11. The gaming system of claim 1, wherein, for each of said game modes, members of said subset of reel strips associated with such game mode are interleaved with members of said subsets associated with other game modes.

12. One or more non-transitory computer readable storage media encoded with instructions for directing a gaming system to perform a method of operating a wagering game, the method comprising:

receiving a wager via a wager input device;

selecting, via a controller, a current game mode from a plurality of available selectable game modes, each game mode being respectively associated with a subset of a plurality of reel strips of a display, each of said subsets containing less than all of the plurality of reel strips;

selectively concealing each of said reel strips other than said subset of said reel strips associated with the current game mode, responsive to said controller; and displaying, via said display, a randomly selected outcome of the wagering game on said subset of reel strips associated with the current game mode.

13. The computer readable storage media of claim 12, wherein said step of selectably concealing reel strips not associated with the current game mode further comprises moving at least one reel strip transversely to a reel window.

14. The computer readable storage media of claim 12, wherein the method further comprises concealing those reel strips not associated with the current game mode by moving a reel window in a direction generally parallel to an axis of the display along which said real strips are located.

15. The computer readable storage media of claim 12, wherein the method further comprises adjusting the opacity of at least one controllable-opacity segment to conceal all reel strips other than the subset of reel strips associated with the current game mode.

16. The computer readable storage media of claim 12, wherein the method further comprises providing an award if said display indicates a winning outcome on said subset of reel strips associated with the current game mode.

17. The computer readable storage media of claim 12, wherein a first game mode of said plurality of available selectable game modes is a basic game and a second game mode of said plurality of available selectable game modes is a bonus game.

18. A method of conducting a wagering game on a gaming system, the method comprising:

a. selecting, using a controller, a game mode from a plurality of available game modes, each of said plurality of game modes being associated with a subset of a plurality of symbol-bearing reel strips, each of said subsets containing less than all of the plurality of reel strips;

b. receiving a wager via an input device;

c. determining, using the controller or another controller, an outcome randomly selected from among a plurality of possible outcomes associated with the selected game mode;

d. displaying on a display said outcome as an array of symbols, said symbols being selected from said subset of reel strips associated with said selected game mode; and e. providing an award if the displayed outcome indicates a winning combination.

19. The method of claim 18, wherein said selecting step thereof further comprises aligning at least one reel window with a portion of at least one reel strip such that only symbols from said subset of reel strips associated with said selected game mode are visible.

20. The method of claim 18 wherein said aligning step thereof further comprises moving said at least one reel window and said symbol-bearing reel strips with respect to the other.

* * * * *